United States Patent
Akimoto

(10) Patent No.: US 11,194,526 B2
(45) Date of Patent: Dec. 7, 2021

(54) IMAGE FORMING APPARATUS, METHOD FOR CONTROLLING THE SAME, AND PROGRAM

(71) Applicant: CANON KABUSHIKI KAISHA, Tokyo (JP)

(72) Inventor: Naoto Akimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 16/528,400

(22) Filed: Jul. 31, 2019

(65) Prior Publication Data

US 2019/0354323 A1 Nov. 21, 2019

Related U.S. Application Data

(63) Continuation of application No. 15/470,699, filed on Mar. 27, 2017, now Pat. No. 10,409,532.

(30) Foreign Application Priority Data

Mar. 31, 2016 (JP) ................................. 2016-072594

(51) Int. Cl.
*G06F 3/12* (2006.01)
*H04N 1/00* (2006.01)

(52) U.S. Cl.
CPC .......... *G06F 3/1219* (2013.01); *G06F 3/1221* (2013.01); *G06F 3/1256* (2013.01); *G06F 3/1258* (2013.01); *H04N 1/0035* (2013.01); *H04N 1/00411* (2013.01); *H04N 2201/0094* (2013.01); *Y02D 10/00* (2018.01)

(58) Field of Classification Search
CPC .... G06F 3/1219; G06F 3/1221; G06F 3/1229; G06F 3/1256; G06F 3/1257; H04N 1/0035; H04N 1/00411; H04N 2201/0094
USPC .................................................. 347/2, 5, 19
See application file for complete search history.

(56) References Cited

U.S. PATENT DOCUMENTS

| | | | |
|---|---|---|---|
| 8,803,890 B2* | 8/2014 | Abe ...................... | G06F 3/1208 345/501 |
| 9,883,057 B2* | 1/2018 | Kirihara ............... | G06K 15/002 |
| 10,409,532 B2* | 9/2019 | Akimoto .............. | H04N 1/0035 |
| 2013/0100478 A1* | 4/2013 | Ogasawara ........... | G06F 3/1279 358/1.14 |
| 2016/0026419 A1* | 1/2016 | Buckby ................. | G06F 3/1254 358/1.9 |

FOREIGN PATENT DOCUMENTS

| | | |
|---|---|---|
| JP | 2002-082581 A | 3/2002 |
| JP | 2006-142727 A | 6/2006 |
| JP | 2006-331436 A | 12/2006 |
| JP | 2015-198363 A | 11/2015 |

* cited by examiner

*Primary Examiner* — An H Do
(74) *Attorney, Agent, or Firm* — Canon U.S.A., Inc. I.P. Division

(57) ABSTRACT

A multifunction peripheral includes a printer and a panel. The printer may perform a print process based on a print job and a process of printing an eco-report. The panel may simultaneously display a print instruction screen and a notification screen. The panel may instruct the print process based on a print job when the two screens are simultaneously displayed.

27 Claims, 11 Drawing Sheets

FIG. 2

| | |
|---|---|
| START TIME | 211 |
| TOTAL PRINT NUMBER | 212 |
| TOTAL COPY NUMBER | 213 |
| TOTAL PC RECORDING NUMBER | 214 |
| TOTAL FAX RECORDING NUMBER | 215 |
| SINGLE-SIDED COPY NUMBER | 221 |
| TWO-SIDED COPY NUMBER | 222 |
| SINGLE-SIDED PC RECORDING NUMBER | 223 |
| TWO-SIDED PC RECORDING NUMBER | 224 |
| SINGLE-SIDED FAX RECORDING NUMBER | 225 |
| TWO-SIDED FAX RECORDING NUMBER | 226 |
| SINGLE-SIDED COPY NUMBER | 231 |
| TWO-SIDED COPY NUMBER | 232 |
| SINGLE-SIDED PC RECORDING NUMBER | 233 |
| TWO-SIDED PC RECORDING NUMBER | 234 |
| SINGLE-SIDED COPY NUMBER | 241 |
| TWO-SIDED COPY NUMBER | 242 |
| SINGLE-SIDED PC RECORDING NUMBER | 243 |
| TWO-SIDED PC RECORDING NUMBER | 244 |
| TOTAL TWO-SIDED COPY NUMBER | 251 |
| TOTAL TWO-SIDED PC RECORDING NUMBER | 252 |
| TOTAL TWO-SIDED FAX RECORDING NUMBER | 253 |
| ECO-REPORT RECOMMENDATION NOTIFICATION TIME | 261 |
| ECO-REPORT LAST PRINTING DATE AND TIME | 262 |

201 — 1ON1 (rows 221–226)
202 — 2ON1 (rows 231–234)
203 — 4ON1 (rows 241–244)

103

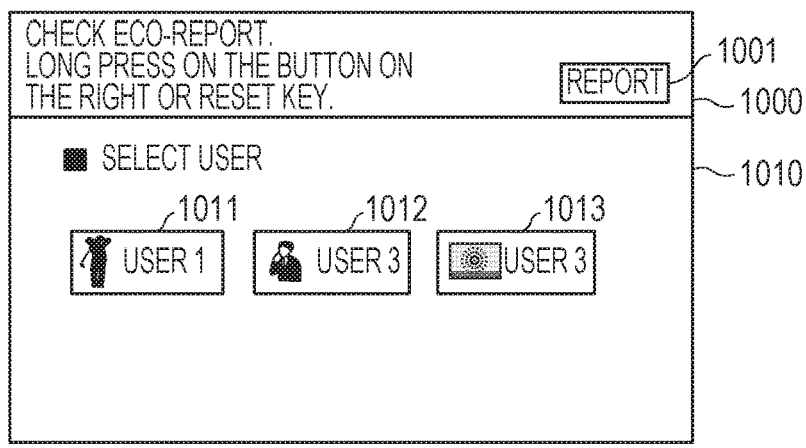
FIG. 10A
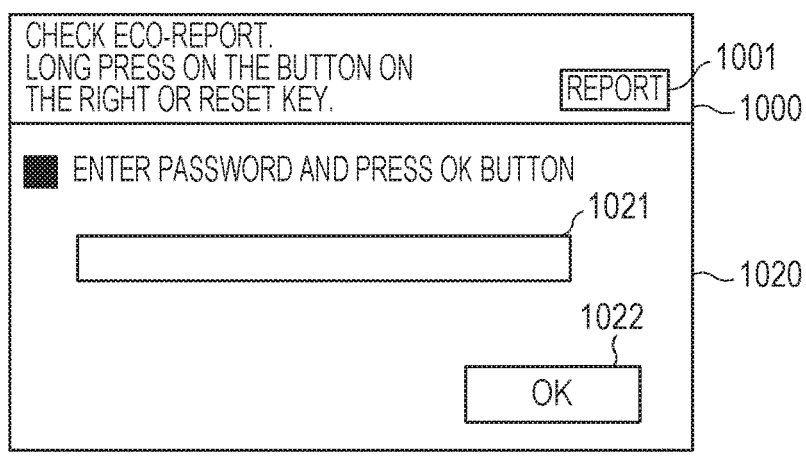
FIG. 10B
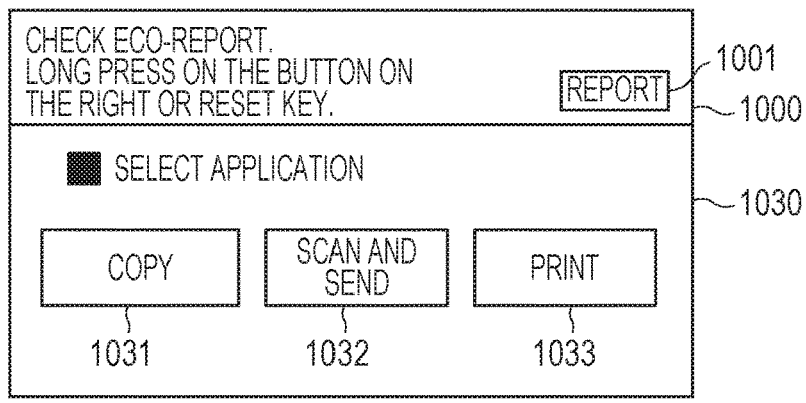
FIG. 10C
FIG. 10D

IMAGE FORMING APPARATUS, METHOD FOR CONTROLLING THE SAME, AND PROGRAM

CROSS-REFERENCE TO RELATED APPLICATIONS

This application is a continuation of U.S. patent application Ser. No. 15/470,699, filed Mar. 27, 2017, which claims the benefit of Japanese Patent Application No. 2016-072594, filed Mar. 31, 2016, all of which are hereby incorporated by reference herein in their entirety.

BACKGROUND

Technical Field

The present disclosure relates to an image forming apparatus which forms an image on a printing material. The image forming apparatus is used as a copier, a printer, a facsimile, or a multifunction peripheral having a plurality of functions, such as a function of the copier, a function of the printer, and a function of the facsimile.

Description of the Related Art

In general, image forming apparatuses perform printing (image formation) on a sheet (a printing material) based on print information input by a user. The print information input by a user is transmitted from an external information terminal by the user, for example, and is based on image information read by a scanner in accordance with a user's operation, for example.

Furthermore, image forming apparatuses which execute printing based on print information input by a user and execute printing independently from the print information input by the user have been used. Japanese Patent Laid-Open No. 2000-318266 discloses an image forming apparatus having a calibration function for reducing variation of a print characteristic. When calibration is to be performed in this image forming apparatus, first, a patch image is printed on a sheet, and thereafter, the patch image on the sheet is scanned so that calibration data is generated. An image for printing is corrected using the calibration data, and therefore, the image forming apparatus may perform printing with desired quality. Since the print characteristic of the image forming apparatus changes with time, the calibration data is preferably updated with time. The image forming apparatus disclosed in Japanese Patent Laid-Open No. 2000-318266 has a function of displaying a notification screen for prompting generation of new calibration data on an operation panel when a predetermined period of time elapses after latest calibration data is generated. In this notification screen, when a user determines whether calibration data is to be newly generated, the display is cancelled. When the display of the notification screen is cancelled, the user may operate the operation panel so as to use various functions.

The image forming apparatus which displays the notification screen for requesting selection performed by the user has poor operability for the user who performs an operation different from content of the notification. In a case where a notification screen prompting printing of a report relating to a use state of the apparatus is displayed in the operation panel, for example, the user who desires to perform printing based on print information cancels the display of the notification screen before performing a print instruction which is troublesome.

SUMMARY

The present disclosure is to provide an image forming apparatus in which deterioration of operability caused by a notification of information is suppressed.

According to an embodiment of the present disclosure, an image forming apparatus includes an image forming unit for forming an image on a sheet and a display unit for displaying information for a user. The image forming apparatus includes a controller having a processor for executing instructions stored in a memory or having circuitry and being configured to display, on the display unit, a screen including a first display region for displaying a notification for prompting execution of a print process based on predetermined information and a second display region for causing the user to select print data, receive an instruction for executing the print process based on the predetermined information after the screen is displayed and cause the image forming unit to form an image based on the predetermined information, and receive an instruction for executing the print process on the selected print data after the screen is displayed and cause the image forming unit to form an image based on the selected print data.

Further features of the present disclosure will become apparent from the following description of exemplary embodiments with reference to the attached drawings.

BRIEF DESCRIPTION OF THE DRAWINGS

FIG. 2 is a diagram illustrating a data storage configuration of a random access memory.

FIG. 6 is a flowchart of a process performed when power is on.

FIG. 10A is a diagram illustrating a user selection screen, FIG. 10B is a diagram illustrating a password input screen, FIG. 10C is a diagram illustrating a function selection screen, and FIG. 10D is a diagram illustrating a print instruction screen.

DESCRIPTION OF THE EMBODIMENTS

Hereinafter, a preferred embodiment of the present disclosure will be described in detail with reference to the accompanying drawings. In this embodiment, a multifunction printer or a multifunction peripheral (MFP) 100 is taken as an example of an image forming apparatus. Note that a range in which the present disclosure is employed is not limited to a configuration of this embodiment. Portions of the configuration may be replaced by equivalents as long as effects of the disclosure are obtained.

Embodiment

Printer Configuration

Figure 1:
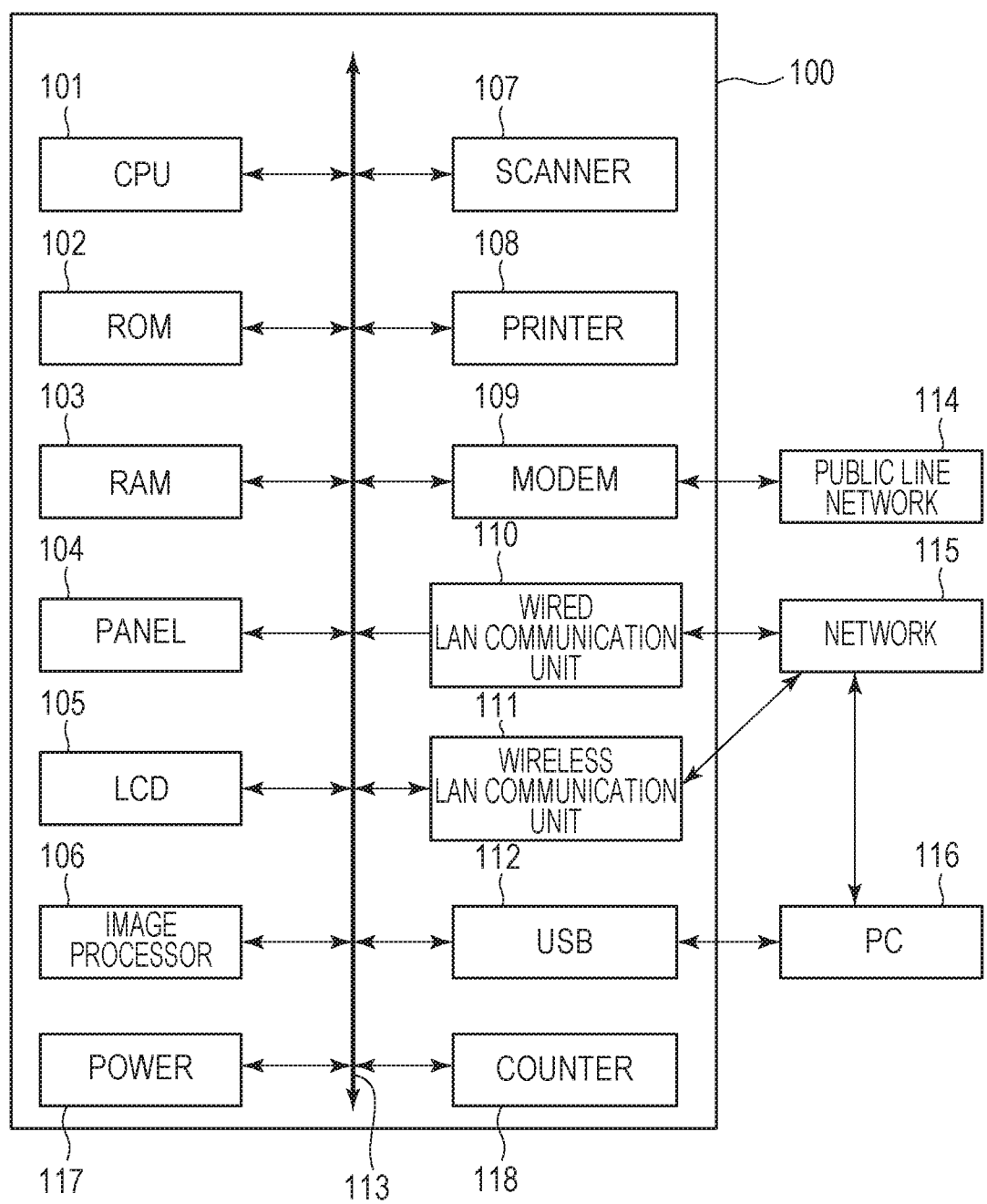
FIG. 1 is a block diagram illustrating a hardware configuration of a multifunction printer/peripheral.

FIG. 1 is a block diagram illustrating a hardware configuration of the MFP 100.

The MFP 100 is an image forming apparatus (a printing apparatus) employed in an image forming system for forming (printing) an image on a recording material (a sheet, recording paper, or a form). As illustrated in FIG. 1, the MFP 100 includes a central processing unit (CPU) 101, a read only memory (ROM) 102, a random access memory (RAM) 103, a panel 104, a liquid crystal display (LCD) 105, an image processor 106, a scanner 107, and a printer 108. The MFP 100 further includes a modem 109, a wired LAN communication unit 110, a wireless LAN communication unit 111, a universal serial bus (USB) 112, and a power 117. The components described above are connected to one another through a system bus 113 in a communication available manner. The MFP 100 is connected to a public line network 114, a network 115, and a personal computer (PC) 116 in a communication available manner.

The CPU (or a calculation processing unit) 101 performs a calculation process. The CPU 101 integrally controls the devices connected to the system bus 113. The CPU 101 executes various processes based on firmware modules stored in the ROM 102. Note that at least two firmware modules are stored, and update may be performed for each module. Furthermore, the CPU 101 executes processes of flowcharts described below based on the firmware modules functioning as control programs. As the calculation processing unit, a micro processing unit (MPU), a micro control unit (MCU), or the like device may be used.

The ROM 102 is a storage unit which stores boot programs of the firmware modules and the system.

The RAM 103 is a storage unit which functions as a main memory and a work area of the CPU 101. In this embodiment, a nonvolatile RAM (NVRAM) is used as the RAM 103. The RAM 103 stores programs such as system software and application software and various data. Furthermore, the RAM 103 is used as a memory in which backup is available for saving apparatus settings.

Figure 9:
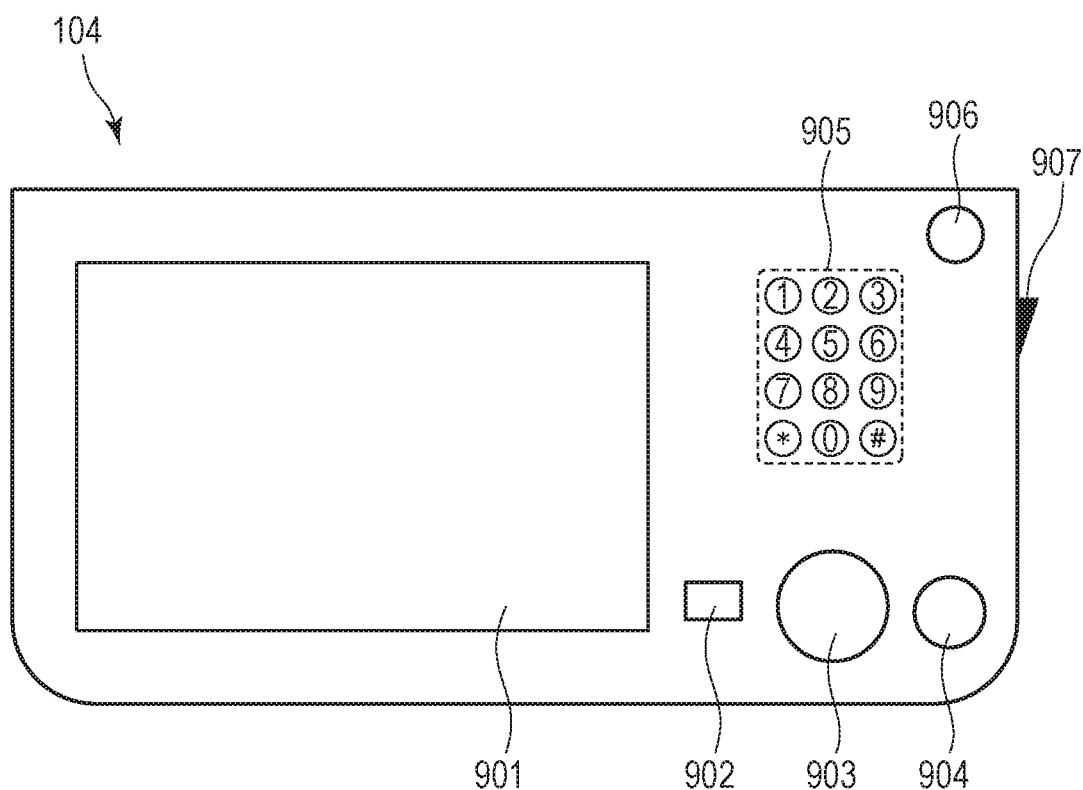
FIG. 9 is a diagram illustrating a configuration of an operation panel.

The panel 104 is a user interface (an operation unit, an operation panel, or an instruction unit) operable by a user. The operation unit includes a power switch, a numeric keypad, one-touch keys, a start key, a stop key, a set key, a reset key, a power saving key, various setting keys, and a light emitting diode (LED), for example. FIG. 9 is a diagram illustrating a configuration of the panel 104. The panel 104 of this embodiment includes a touch panel 901 and hardware keys (physical buttons) including a reset key 902, a start key 903, a stop key 904, a numeric keypad 905, a power saving key 906, and a power switch 907 which are to be pressed.

In addition to the LCD 105, the touch panel 901 includes a sensor (not illustrated) employing a resistance film pressure method or an electrostatic capacitance method as a detection unit which detects a touch operation performed by a user. The LCD 105 is a liquid crystal screen (a display unit) which displays information for the user. Any device may be used as the LCD 105 as long as information may be displayed in a screen. The LCD 105 displays a message and an object (an icon or a button) for the user so as to prompt the user to perform an instruction operation. For example, the object (the icon or the button) is displayed in the liquid crystal screen of the touch panel 901, and the sensor detects a touch in the vicinity of the object by the user. In this case, the touch panel 901 recognizes that the user has performed a touch operation to select the object. The touch panel 901 may selectively display a plurality of screens by switching the screens from one to another in accordance with a touch operation.

The reset key 902 is a button used for cancel of an instruction or a setting and for return to a preceding screen. The start key 903 is a button used to determine an execution of copying or printing. The stop key 904 is a button used to stop printing being performed. The numeric keypad 905 includes buttons used to input a password and a telephone number. The power saving key 906 is a button used to switch a power saving state of the MFP 100. When the power saving key 906 is pressed, the MFP 100 is brought into a sleep state from a standby state or brought into a standby state from a sleep state. The power switch 907 is a seesaw switch for performing switching between ON and OFF of the MFP 100. When the power switch 907 is turned on, electric power is supplied to the MFP 100. When the power switch 907 is turned off, the supply of the electric power to the MFP 100 is stopped and the MFP 100 is brought into a shutdown state.

The image processor 106 is a circuit which executes image processing under control of the CPU 101. The image processor 106 decodes print data (a print job and print information) received from an external apparatus so as to convert the data into raw data, for example. The image processor 106 compresses an image read by the scanner 107 into JPEG data, for example.

The scanner 107 may be a reading apparatus or a reading unit which performs a process of reading an image of a document by an optical sensor. The scanner 107 reads the document so as to generate image data. The generated image data is used as print data for printing, for example. Note that an auto document feeder may be attached to the scanner 107 so that a plurality of documents are automatically read.

The printer 108 has a machine mechanism which forms an image on a recording material (a sheet or a form) based on print information and functions as an image forming unit. The printer 108 of this embodiment employs an electrophotographic method. The printer 108 may have a machine mechanism employing another method, such as an inkjet method, instead of the electrophotographic method, as long as an image may be formed on a sheet.

The modem 109 is a communication interface for connection to the public line network 114. The modem 109 has a data conversion function for communication of facsimile data.

The wired LAN communication unit 110 is a communication interface for connection to the network 115 through a wired LAN in a communication available manner. The wired LAN communication unit 110 controls a network interface so as to perform communication of data with other terminals and servers on the network. The PC 116 is connected to the network 115 in a communication available manner.

The wireless LAN communication unit 111 is a communication interface for connection to the network 115 through a wireless LAN. The wireless LAN communication unit 111 may be connected to a wireless LAN router (not illustrated) using a wireless LAN communication function. Then the wireless LAN communication unit 111 may be connected to the network 115 through the wireless LAN router in a communication available manner.

The USB 112 is a communication interface having a USB device function. The USB 112 may be connected to the PC 116 through a USB cable (not illustrated) in a communication available manner. Then the USB 112 may receive a function instruction, such as a scan instruction or a print instruction, from the PC 116.

The wired LAN communication unit 110, the wireless LAN communication unit 111, and the USB 112 are a reception unit which receives print information (a print job or print data) transmitted from the PC 116 (an external information terminal) in response to an instruction issued by a user. The received print information is stored in the RAM 103. Note that a large-capacity storage device, such as an HDD, may be provided so as to store the print information.

The power 117 is a power source which supplies electric power to the components of the MFP 100. The power 117 may has a running state, a standby state, a sleep state, and a shutdown state.

In the running state, electric power is supplied to the components of the MFP 100 so that printing is executable. The power 117 supplies electric power to the components below in the running state. The components includes the CPU 101, the ROM 102, the RAM 103, the panel 104, the LCD 105, the image processor 106, at least one of the scanner 107 and the printer 108, the modem 109, the wired LAN communication unit 110, the wireless LAN communication unit 111, the USB 112, and a counter 118.

In the standby state, electric power is supplied to a portion near a controller of the MFP 100 so that print data is processed. The power 117 supplies electric power to the components below in the standby state. The components includes the CPU 101, the ROM 102, the RAM 103, the panel 104, the LCD 105, the image processor 106, the modem 109, the wired LAN communication unit 110, the wireless LAN communication unit 111, the USB 112, and the counter 118.

In the sleep state, when a print job is input, the sleep state returns (is recovered) to the standby state. Therefore, electric power is supplied to a minimum of portions of the MFP 100 in the sleep state. In the sleep state, the power 117 supplies electric power to the power saving key 906 of the panel 104, the modem 109, the wired LAN communication unit 110, and the wireless LAN communication unit 111.

In the shutdown state, the MFP 100 does not operate and electric power is not supplied to the components of the MFP 100.

The counter 118 is a timekeeping unit which measures an elapsed time. The counter 118 may obtain a current date in addition to a time by continuously counting time which elapses from an initial setting value. The CPU 101 functions as a time information obtaining unit which obtains a current time from the counter 118.

Data

Next, a configuration of the RAM 103 will be described in detail. FIG. 2 is a diagram illustrating a configuration of the RAM 103 of this embodiment. The RAM 103 has storage regions which store various data. Examples of the storage regions which store information on a status include a start time 211. The start time 211 corresponds to a region which stores data indicating a date and time when the apparatus shipped from a factory performs printing for the first time in a location of the user.

Examples of storage regions for storing information (history information of printing) associated with the number of printed sheets include a total print number 212, a total copy number 213, a total PC recording number 214, and a total FAX recording number 215. The total print number 212 corresponds to a region which stores data indicating the total number of sheets printed by the apparatus. The total copy number 213 corresponds to a region which stores information on the total number of sheets copied by the apparatus. The total PC recording number 214 corresponds to a region which stores information on the total number of sheets printed by the apparatus in response to a print instruction issued by the PC 116. The total FAX recording number 215 corresponds to a region which stores information on the total number of sheets recorded by the apparatus in response to reception of FAX documents.

The RAM 103 includes an 1in1 (1on1) storage region 201, a 2in1 (2on1) storage region 202, and a 4in1 (4on1) storage region 203 as storage regions which store number information for individual types of printing.

The 1in1 storage region 201 stores information on the numbers of sheets printed in 1IN1 printing in which original data for one page is recorded on one surface. Examples of storage regions of the 1in1 storage region 201 include a single-sided copy number 221, a two-sided copy number 222, a single-sided PC recording number 223, a two-sided PC recording number 224, a single-sided FAX recording number 225, and a two-sided FAX recording number 226.

The 2in1 storage region 202 stores information on the numbers of sheets printed in 2IN1 printing in which original data for two pages is recorded on one surface. Examples of storage regions of the 2in1 storage region 202 include a single-sided copy number 231, a two-sided copy number 232, a single-sided PC recording number 233, and a two-sided PC recording number 234.

The 4in1 storage region 203 stores information on the numbers of sheets printed in 4IN1 printing in which original data for four pages is recorded on one surface. Examples of storage regions of the 4in1 storage region 203 include a single-sided copy number 241, a two-sided copy number 242, a single-sided PC recording number 243, and a two-sided PC recording number 244.

Examples of a storage region for information associated with the number of two-sided printed sheets include a total two-sided copy number 251, a total two-sided PC recording number 252, and a total two-sided FAX recording number 253. The total two-sided copy number 251 corresponds to a region which stores information on the total number of sheets copied by the apparatus in a two-sided manner. The total two-sided PC recording number 252 corresponds to a region which stores information on the total number of sheets printed by the apparatus in a two-sided manner in response to a print instruction issued from the PC 116. The total two-sided FAX recording number 253 corresponds to a region which stores information on the total number of sheets obtained as a result of two-sided printing performed on received FAX documents. The numbers of sheets described above are calculated (counted) by the CPU 101 and stored and updated in the RAM 103 as the information every time corresponding printing operations are performed. The CPU 101 functions as a history information obtaining unit which reads history information from the RAM 103. Examples of the history information include the total print number 212, the total copy number 213, the total PC recording number 214, the total FAX recording number 215, the 1in1 storage region 201, the 2in1 storage region 202, the 4in1 storage region 203, the total two-sided copy number 251, the total two-sided PC recording number 252, and the total two-sided FAX recording number 253.

Examples of information on setting values of the MFP 100 include an eco-report recommendation notification time 261 and an eco-report last printing date and time 262.

The eco-report recommendation notification time 261 corresponds to a storage region which stores information on a time point when a notification for prompting eco-report printing is to be transmitted to the user. After the notification for prompting the eco-report printing is transmitted, the CPU 101 updates the eco-report recommendation notification time 261 to information on a time point when a next notification is to be performed.

The eco-report last printing date and time 262 corresponds to a storage region which stores information on a date and time when a last eco-report is printed.

Eco-Report

Figure 3:
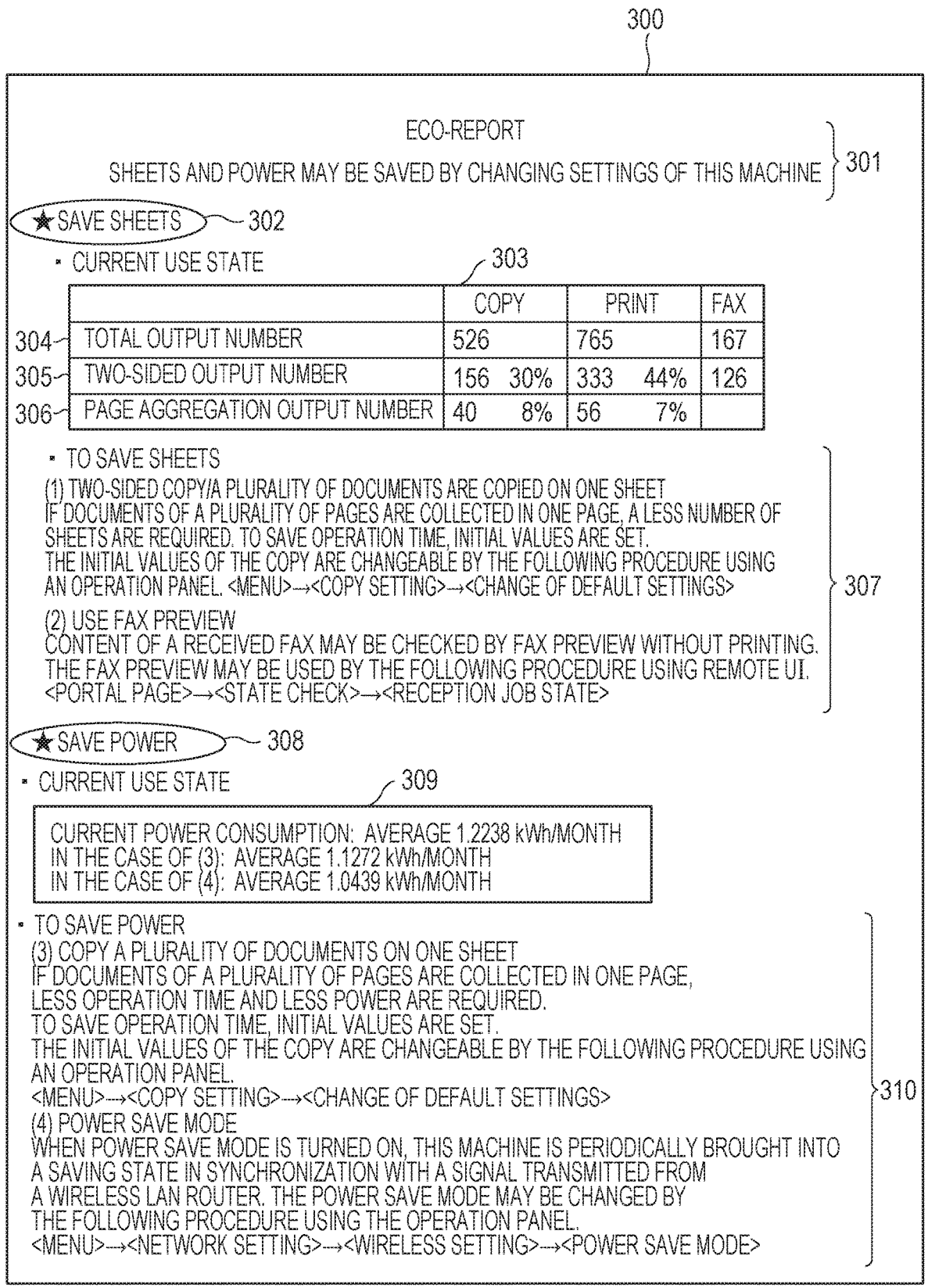
FIG. 3 is a diagram illustrating a configuration of an eco-report.

Next, an eco-report 300 will be described in detail. FIG. 3 is a diagram illustrating a configuration of the eco-report 300 printed in this embodiment. The MFP 100 has an eco-report function. The eco-report function enables printing of a list of information on use states of the apparatus. In the eco-report 300, the number of printed sheets in a month is described, for example. The user may realize a current state by checking the eco-report 300 and perform a setting for suppressing the number of sheets to be printed.

The eco-report 300 includes a title portion 301, a sheet saving portion including reference numerals 302 to 307, and a power saving portion including reference numerals 308 to 310.

The sheet saving portion includes a title 302, a use state 303, and a suggestion portion 307. The title 302 includes a title for prompting saving of sheets. The use state 303 includes use states of printing functions. The use state 303 includes a total output number 304, a two-sided output number 305, and a page aggregate output number 306.

The total output number 304 includes the number of sheets printed by a copy function, the number of sheets printed by a print function, and the number of sheets printed by a FAX function. The two-sided output number 305 includes the number of sheets printed in a two-sided manner by the copy function and a rate thereof, the number of sheets printed in the two-sided manner by the print function and a rate thereof, and the number of sheets printed in the two-sided manner by the FAX function and a rate thereof. The page aggregate output number 306 includes the number of sheets printed in a two-sided manner by the copy function and a rate thereof, and the number of sheets printed in the two-sided manner by the print function and a rate thereof. Examples of the page aggregate printing include the 2IN1 printing for collectively printing two documents in one sheet and the 4IN1 printing for collectively printing four documents in one sheet. In this embodiment, the numbers of printed sheets described in the eco-report 300 are obtained after the MFP 100 is operated. However, the numbers of printed sheets described in the eco-report 300 may be obtained by extracting only the numbers of sheets printed within a predetermined period of time. For example, the numbers of sheets printed in one month may be described as the numbers of printed sheets. In the suggestion portion 307, suggestions for enhancing a sheet saving effect are described. Examples of the suggestions include a suggestion for prompting use of the two-sided printing and a suggestion for use of the page aggregate printing.

The power saving portion includes a title 308, a use state 309, and a suggestion portion 310. The title 308 includes a title for prompting saving of power. The use state 309 includes a current power consumption state and estimation results of power consumption obtained when settings described in the power saving suggestion portion 310 are performed. Information on the power consumption (electric power information) is generated by the CPU 101 based on used power of the power 117 within a predetermined period of time and stored in the RAM 103 in advance. In this case, the CPU 101 functions as an electric power information obtaining unit.

The suggestion portion 310 includes suggestions for enhancing a power saving effect. Examples of the suggestions include a suggestion for prompting use of the page aggregate printing and a suggestion for prompting use of the power save mode in the wireless LAN communication unit 111.

Eco-Report Printing Process

Figure 4:
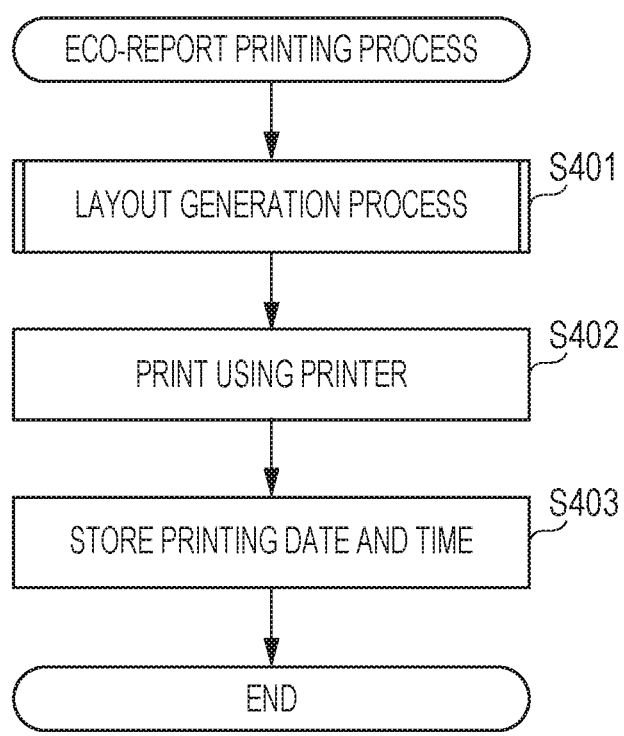
FIG. 4 is a flowchart of a processing step of eco-report printing.

Next, a process of printing the eco-report 300 described above will be described. FIG. 4 is a flowchart of an eco-report printing process according to this embodiment.

The eco-report printing is executed when the user operates the panel 104 so as to select an eco-report printing function in a report printing menu. Alternatively, the eco-report printing is executed when a predetermined operation is performed during a notification process of prompting the eco-report printing described below.

When the eco-report printing function is selected, the CPU 101 performs a layout generation process for the eco-report 300 (S401). Layout of the eco-report 300 is illustrated in FIG. 3. Subsequently, the CPU 101 causes the printer 108 to execute a print process based on the generated report data (S402). Thereafter, the CPU 101 stores information on a date and time of the printing of the eco-report 300 in the eco-report last printing date and time 262 in the RAM 103 before terminating the process (S403).

Figure 5:
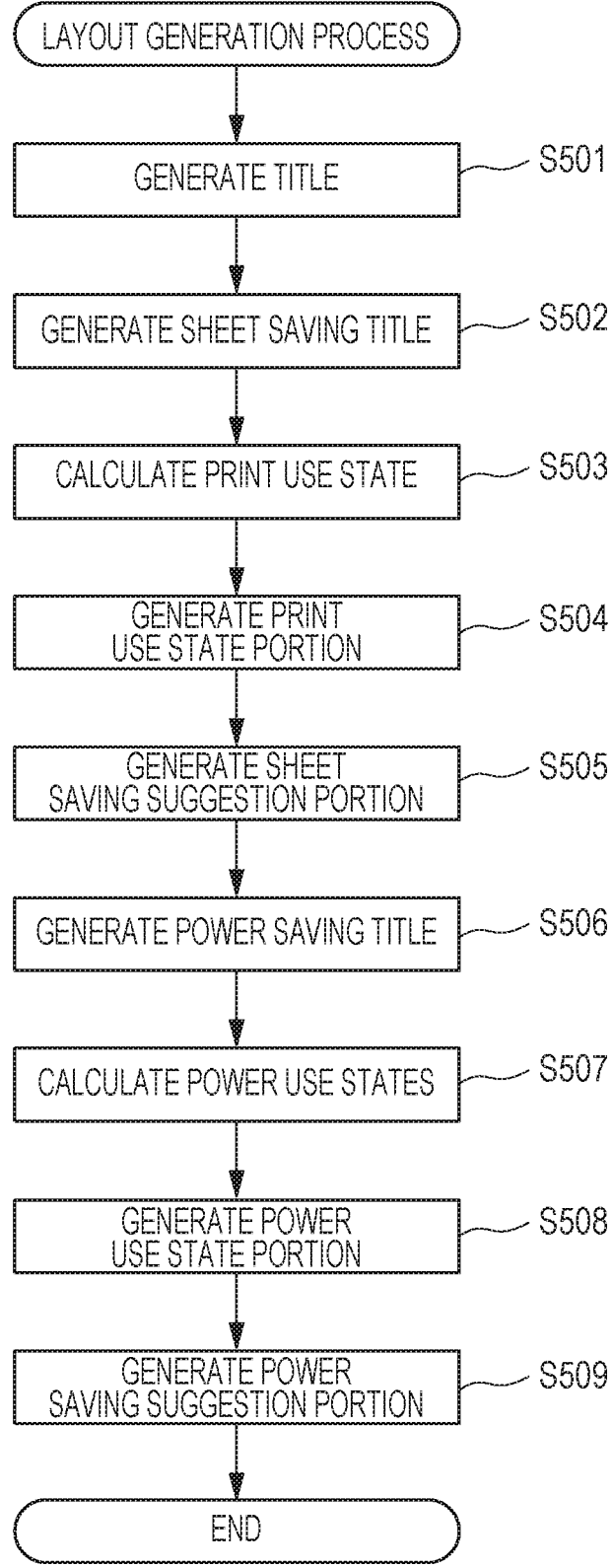
FIG. 5 is a flowchart of a step of an eco-report layout generation process.

FIG. 5 is a flowchart of the eco-report layout generation process in step S401 according to this embodiment.

When starting the layout generation process, the CPU 101 generates the title portion 301 of the eco-report 300 (S501). Specifically, the CPU 101 develops information on the title portion 301 stored in the ROM 102 as font data and stores the font data in a specific position in an eco-report output area in the RAM 103. Thereafter, the CPU 101 generates the sheet saving title 302 of the eco-report 300 (S502). The CPU 101 develops information on the sheet saving title 302 stored in the ROM 102 as font data and stores the font data in a specific position in the eco-report output area in the RAM 103.

The CPU 101 calculates the numbers of printed sheets described in the use state 303 of the printing function (S503). In a case where the total output number 304 in copy is to be obtained, for example, the CPU 101 uses information on the total copy number 213 in the RAM 103 as it is. In a case where the two-sided output number 305 in copy is to be obtained, for example, the CPU 101 uses information on the total two-sided copy number 251 in the RAM 103 as it is. In a case where a rate of a total two-sided copy number to the total copy number is to be obtained, for example, the CPU 101 divides the total two-sided copy number 251 by the total copy number 213. In a case where the page aggregate output number 306 in copy is to be obtained, the CPU 101 obtains a sum of the single-sided copy number 231 of the 2IN1 copy, the two-sided copy number 232 of the 2IN1 copy, the single-sided copy number 241 of the 4IN1 copy, and the two-sided copy number 242 of the 4IN1 copy. The CPU 101 may obtain a rate of the page aggregate number to the total copy number by dividing a value of the obtained sum by the total copy number 213. The CPU 101 performs this operation on the PC printing and the FAX printing so as to calculate the use states in the eco-report 300.

The CPU 101 generates the print use state 303 (S504). The CPU 101 reads a table format and text information to be displayed from the RAM 103 and stores the table format and the text information in specific portions in the eco-report output area of the RAM 103. When information, such as the number of printed sheets or a rate is to be output, the CPU 101 develops the font data in accordance with data obtained as a result of the calculation in step S503 and stores the font data in a specific position of the eco-report output area in the RAM 103.

The CPU 101 generates the sheet saving suggestion portion 307 (S505). Specifically, the CPU 101 reads information on the sheet saving suggestion portion 307 stored in the ROM 102, develops the information as font data, and stores the font data in a specific position in the eco-report output area in the RAM 103.

Thereafter, the CPU 101 generates the power saving title 308 of the eco-report 300 (S506). Specifically, the CPU 101 reads information on the power saving title portion 308 stored in the ROM 102, develops the information as font data, and stores the font data in a specific position in the eco-report output area in the RAM 103.

The CPU 101 calculates a power use amount to be described in the power use state 309 (S507). Furthermore, the CPU 101 estimates power use amounts obtained if suggestions for power saving are realized. Subsequently, the CPU 101 generates the power use state 309 (S508). The CPU 101 reads information on a table format and text information to be displayed from the RAM 103, develops the table format and the text information as font data, and stores the font data in specific portions in the eco-report output area of the RAM 103. The CPU 101 develops the font data in accordance with data on a result of the calculations of the power use amounts and stores the font data in specific positions in the eco-report output area of the RAM 103.

The CPU 101 generates the power saving suggestion portion 310 (S509). Specifically, the CPU 101 reads information on the power saving suggestion portion 310 stored in the ROM 102, develops the information as font data, and stores the font data in a specific position in the eco-report output area in the RAM 103.

Eco-Report Notification Screen

Next, an eco-report notification screen will be described. In this embodiment, a notification screen for prompting printing of the eco-report 300 may be displayed on the panel 104. The user may operate the panel 104 so as to issue another instruction in a state in which the notification is displayed on the panel 104. Specifically, the notification does not disturb any operation performed by the user on the panel 104. Hereinafter, the eco-report notification screen will be described in detail with reference to the accompanying drawings.

Figure 11A:
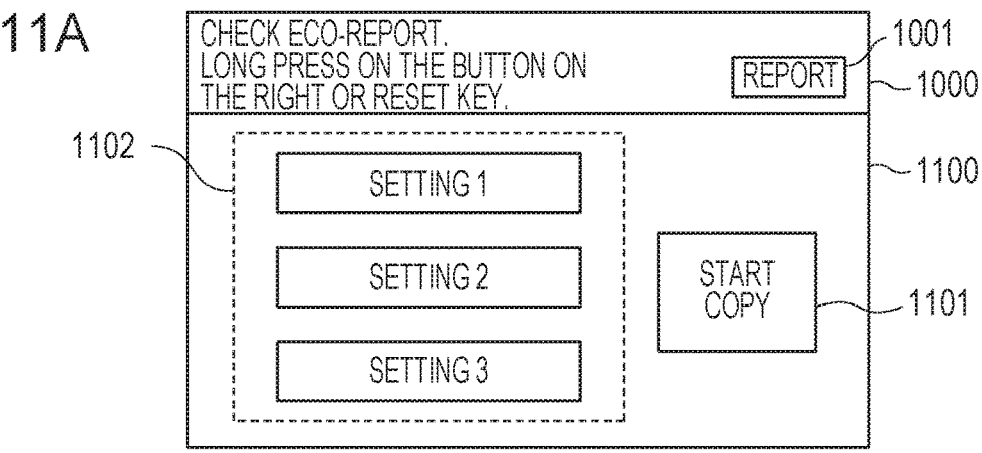
FIG. 11A is a diagram illustrating a copy instruction screen.
Figure 11B:
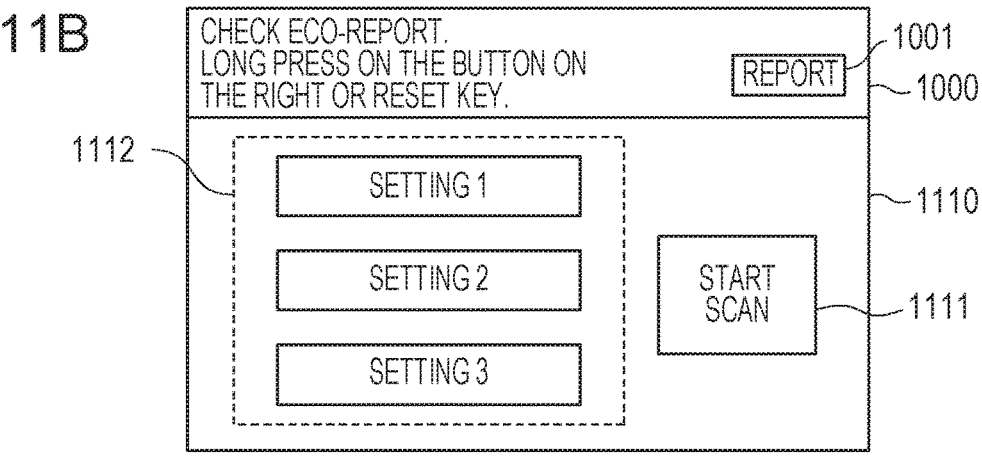
FIG. 11B is a diagram illustrating a scan instruction screen.
Figure 11C:
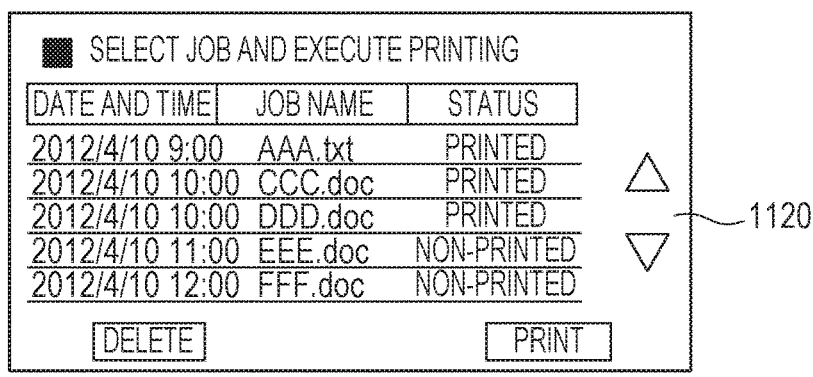
FIG. 11C is a diagram illustrating a print instruction screen in a case where a notification screen is not displayed.
Figure 11D:
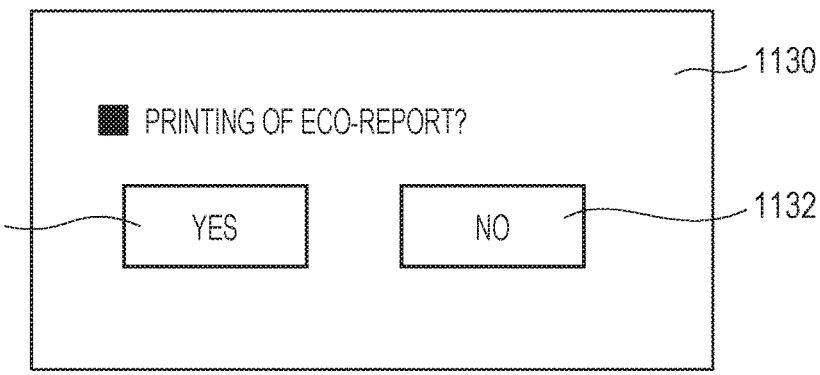
FIG. 11D is a diagram illustrating a confirmation screen of the eco-report printing.

FIG. 10A is a diagram illustrating a user selection screen, FIG. 10B is a diagram illustrating a password input screen, FIG. 10C is a diagram illustrating a function selection screen, and FIG. 10D is a diagram illustrating a print instruction screen. FIG. 11A is a diagram illustrating a copy instruction screen, FIG. 11B is a diagram illustrating a scan instruction screen, FIG. 11C is a diagram illustrating a print instruction screen in a case where the notification screen is not displayed, and FIG. 11D is a diagram illustrating a confirmation screen of the eco-report printing.

When the MFP 100 in a shutdown state is activated or when the MFP 100 returns from a sleep state by pressing a power saving button, the touch panel 901 is turned on and a user selection screen 1010 is displayed. Specifically, the touch panel 901 performs a transition process from a screen display disabling (display unavailable) state to a screen display enabling state.

The selection screen 1010 is used to authenticate an operation user who operates the panel 104 (a login region or a user selection region). The selection screen 1010 includes user icons 1011 to 1013 arranged thereon based on user information registered in advance. When one of the user icons 1011 to 1013 is selected, a password input screen 1020 is displayed on the touch panel 901 as illustrated in FIG. 10B.

The input screen 1020 is used to prompt the user to input a password (the login region or a password input region). The input screen 1020 includes an input form 1021 for inputting a password and an OK button 1022. When a password is input to the input form 1021 and the OK button 1022 is selected, an authentication process is started. In the authentication process, the CPU 101 compares a combination of the selected user icon and the input password with authentication information stored in advance in the RAM 103. In this case, the CPU 101 functions as an authentication unit. When the authentication fails, the input screen 1020 is displayed on the touch panel 901 again, whereas when the authentication is successfully performed, a function selection screen 1030 is displayed on the touch panel 901 as illustrated in FIG. 10C.

The function selection screen 1030 is used to select a desired function from among functions executable by the MFP 100 (a selection region). The MFP 100 of this embodiment includes the scanner 107 and the printer 108, and a copy function, a scan function, and a print function are available. The selection screen 1030 includes a copy function selection button 1031, a scan function selection button 1032, and a print function selection button 1033 arranged thereon.

When one of the function buttons is selected in the function selection screen 1030, a function screen is displayed on the touch panel 901. Specifically, when the print function selection button 1033 is selected, a print instruction screen 1040 is displayed. When the copy function selection button 1031 is selected, a copy instruction screen 1100 illustrated in FIG. 11A is displayed. When the scan function selection button 1032 is selected, a scan instruction screen 1110 illustrated in FIG. 11B is displayed.

The instruction screen 1040 is used to instruct execution of printing (a print process) (an instruction region). The instruction screen 1040 includes a list 1042 of print jobs associated with the authenticated user and a print execution button 1041. The print jobs are transmitted from the PC (an external information terminal) 116 operated by the user through a network. The user may instruct the MFP 100 to perform printing by operating the panel 104 so as to select one of the jobs in the list 1042 and selecting the execution button 1041. Furthermore, the user may instruct the MFP 100 to perform printing by operating the panel 104 so as to select one of the jobs in the list 1042 and selecting the start key 903.

The instruction screen 1100 is used to instruct execution of copy (a copy process). The instruction screen 1100 includes a setting button group 1102 used to perform various settings and an execution button 1101 arranged thereon.

The instruction screen 1110 is used to instruct execution of scanning (a reading process). The copy instruction screen 1110 includes a setting button group 1112 used to perform various settings and an execution button 1111 arranged thereon.

Note that, if a certain condition described below is satisfied when the selection screen 1010, the input screen 1020, the selection screen 1030, or the instruction screen 1040 is displayed, an eco-report notification screen 1000 is displayed. A case where the instruction screen 1040 is displayed will be described hereinafter as a representative of the function screens.

The notification screen 1000 is used to prompt printing of the eco-report 300 (a notification region). The notification screen 1000 includes text for prompting execution of the eco-report 300 and a report execution button 1001 arranged thereon. The notification screen 1000 is a sub-screen displayed on a portion of a main screen, such as the selection screen 1010, the input screen 1020, the selection screen 1030, or the print instruction screen 1040, in an overlapping manner (an overlapping process). Specifically, on the touch panel 901, both of the notification screen 1000 and the main screen are simultaneously displayed. If the notification screen 1000 is overlapped on the main screen, it may be difficult to recognize information displayed on the main screen. In particular, an amount of information displayed in the function screen, such as the print instruction screen 1040, is large, and therefore, a portion of the information may be hidden. Accordingly, an instruction screen 1120 illustrated in FIG. 11C which does not include the notification screen 1000 and the instruction screen 1040 may be alternately displayed. Specifically, the notification screen 1000 flickers at this time. With this configuration, even in a case where a region of a screen which may display the touch panel 901 is small, the notification screen 1000 may be displayed. Furthermore, the notification screen 1000 may be displayed in parallel to the main screen without being overlapped on the main screen. In this case, a display region for the main screen becomes small when the notification screen 1000 is displayed, and therefore, the main screen is displayed in a size reduction manner.

When the user selects the execution button 1001 or performs a long press on the reset key 902 (continuously presses the reset key 902 for a predetermined period of time), the eco-report printing is started. Specifically, when the start key 903 is pressed while the instruction screen 1040 and the notification screen 1000 are displayed, a process of printing a print job input by the user is executed. On the other hand, when the reset key 902 is pressed when the instruction screen 1040 and the notification screen 1000 are displayed, the process of printing the eco-report 300 is executed. Since the different physical keys are assigned, an error in operation by the user may be suppressed. Similarly, even in the instruction screens 1100 and 1110, different physical keys having different functions may be provided. Furthermore, in this embodiment, a name "report" is assigned to the execution button 1001 and a name "print" is assigned to the print execution button 1041. Since the different display names are assigned in this way, operation mistakes by the user may be suppressed.

Note that, when the execution button 1001 or the reset key 902 is selected, a confirmation screen 1130 for checking the eco-report printing may be displayed on the touch panel 901 as illustrated in FIG. 11D. In this case, when an approval button 1131 is selected in the displayed confirmation screen 1130, the eco-report printing is started. When a disapproval button 1132 is selected, the eco-report printing is not started. Note that, when the disapproval button 1132 is selected, the notification screen 1000 may not be displayed. When the confirmation screen 1130 is not displayed, a response property of the eco-report printing may be improved. On the other hand, when the confirmation screen 1130 is displayed, a printing error of the eco-report 300 due to an error touch may be suppressed.

Eco-Report Notification Control

Next, control of a notification for prompting the eco-report printing will be described in detail. In this embodiment, this notification is periodically transmitted once a month, and therefore, the user may periodically output the eco-report 300 based on the notification. Furthermore, the notification disappears after a certain time elapses. Alternatively, this notification disappears when the eco-report 300 is printed. Therefore, it is unlikely that a portion of the display region of the panel 104 is occupied by the notification all the time. This notification is displayed when the user operates the panel 104. Therefore, the user who operates the operation unit may reliably recognize content of the notification. The notification will be described in detail hereinafter with reference to the accompanying drawings.

Figure 6:
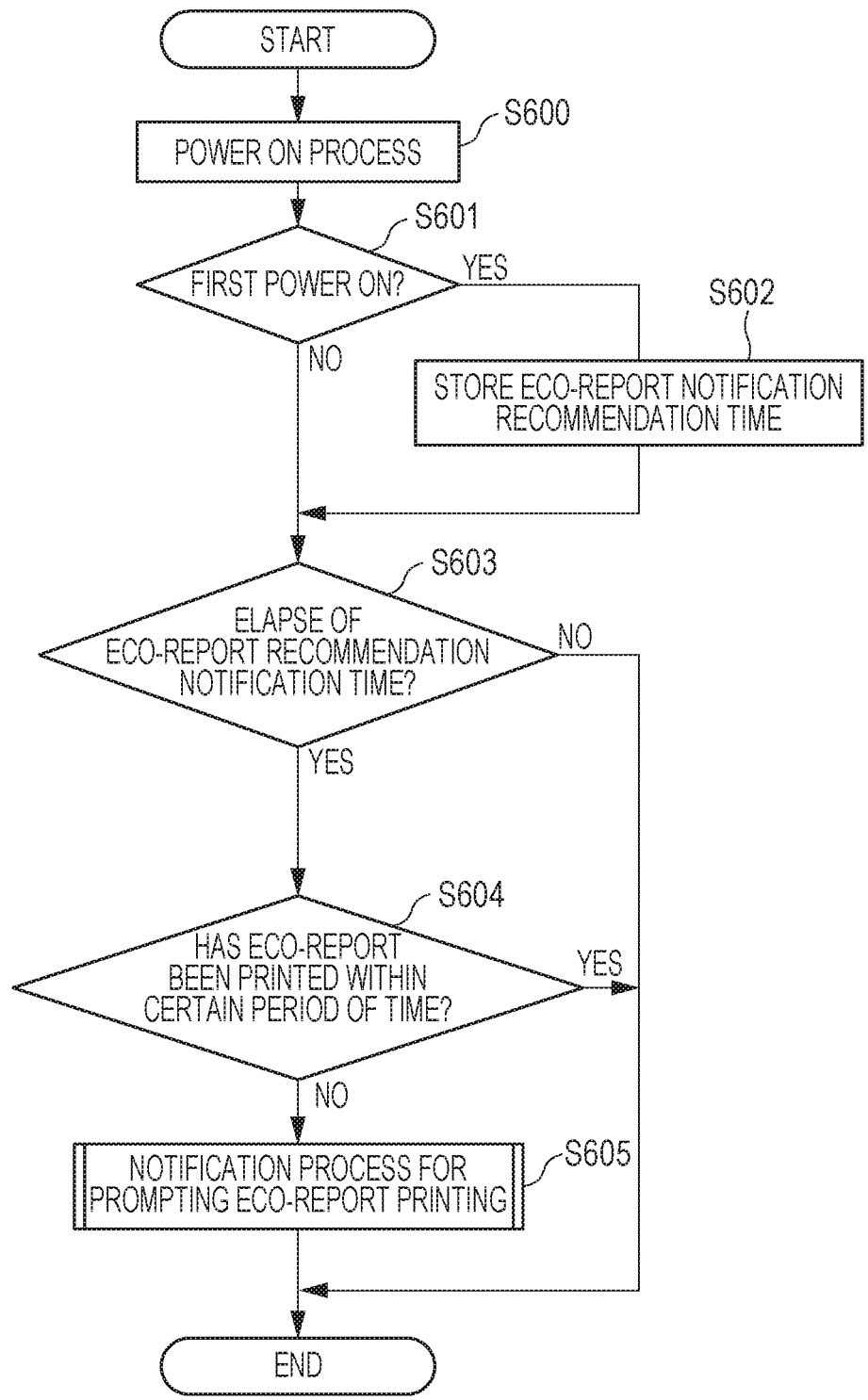

First, control performed when the MFP 100 is turned on will be described. FIG. 6 is a flowchart of a process of an eco-report recommendation notification performed when the MFP 100 is turned on.

When the user operates the power switch 907, the MFP 100 is turned on (S600). When the CPU 101 operates, the MFP 100 determines whether the MFP 100 is turned on for the first time after the apparatus is shipped (S601). The determination is made based on apparatus information (a shipping flag) included in the RAM 103.

When the determination is negative (S601: No), the CPU 101 proceeds to step S603.

When the determination is affirmative (S601: Yes), the CPU 101 calculates an eco-report recommendation notification time and stores the eco-report recommendation notification time in the eco-report recommendation notification time 261 of the RAM 103. Note that a timing when the eco-report recommendation notification is performed is determined in advance in a program included in the ROM 102. In a case where the timing is 9:00 am in the 20th day of each month, the CPU 101 determines 9:00 am in the next 20th day as an eco-report recommendation notification time in accordance with information on a current time. Thereafter, the CPU 101 proceeds to step S603.

The CPU 101 obtains a current time (an execution time of an activation process) from the counter 118 and compares the current time with the eco-report recommendation notification time. Specifically, the CPU 101 determines whether the current time has reached the eco-report recommendation notification time (S603). When the current time has not reached the eco-report recommendation notification time (S603: No), the CPU 101 terminates the process. On the other hand, when the current time has reached the eco-report recommendation notification time (S603: Yes), the CPU 101 proceeds to step S604.

The CPU 101 determines whether the eco-report 300 has been printed within a predetermined period of time (S604). Specifically, the CPU 101 compares the current time with information on the eco-report last printing date and time 262. Then the CPU 101 determines whether the current time is different from the eco-report last printing date and time 262 by at least the certain number of days. Note that the certain number of days is stored in the ROM 102 as day threshold information (not illustrated).

When it is determined that the eco-report 300 has been printed within a predetermined period of time (S604: Yes), the CPU 101 terminates the process. This is because the eco-report 300 was printed recently and a notification is not required. When it is determined that the eco-report 300 has not been printed within the predetermined period of time (S604: No), the CPU 101 performs a notification process for prompting the eco-report printing (S605).

The notification process for prompting the eco-report printing will be described in detail hereinafter.

According to the flow described above, it may be determined whether the eco-report recommendation notification time has elapsed when the MFP 100 is turned on. When the eco-report printing has not been performed within the predetermined period of time, a notification for prompting the eco-report printing may be displayed. Since the notification is displayed when the power is on, the user who is positioned close to the MFP 100 so as to operate the power switch 907 may reliably recognize content of the notification displayed on the touch panel 901.

Next, control performed when the MFP 100 returns from a power saving state will be described. The MFP 100 in the sleep state returns to the standby state due to various reasons. Examples of the various return reasons include a reception of a print job from the PC, a reception of FAX, and a press of the power saving key 906 disposed on the panel 104. Here, a notification for prompting the eco-report printing is to be displayed when the power saving key 906 is pressed, that is, when the user is seen to be reliably in front of the MFP 100. Therefore, in this embodiment, a notification for prompting the eco-report printing is performed when the MFP 100 returns when the power saving key 906 is pressed. Note that other methods may be employed as long as the user near the MFP 100 may be detected. For example, a human detectable sensor, such as an ultrasonic sensor or an infrared sensor, may be used. However, the configuration of this embodiment which does not require such a special sensor is preferable in terms of cost.

Figure 7:
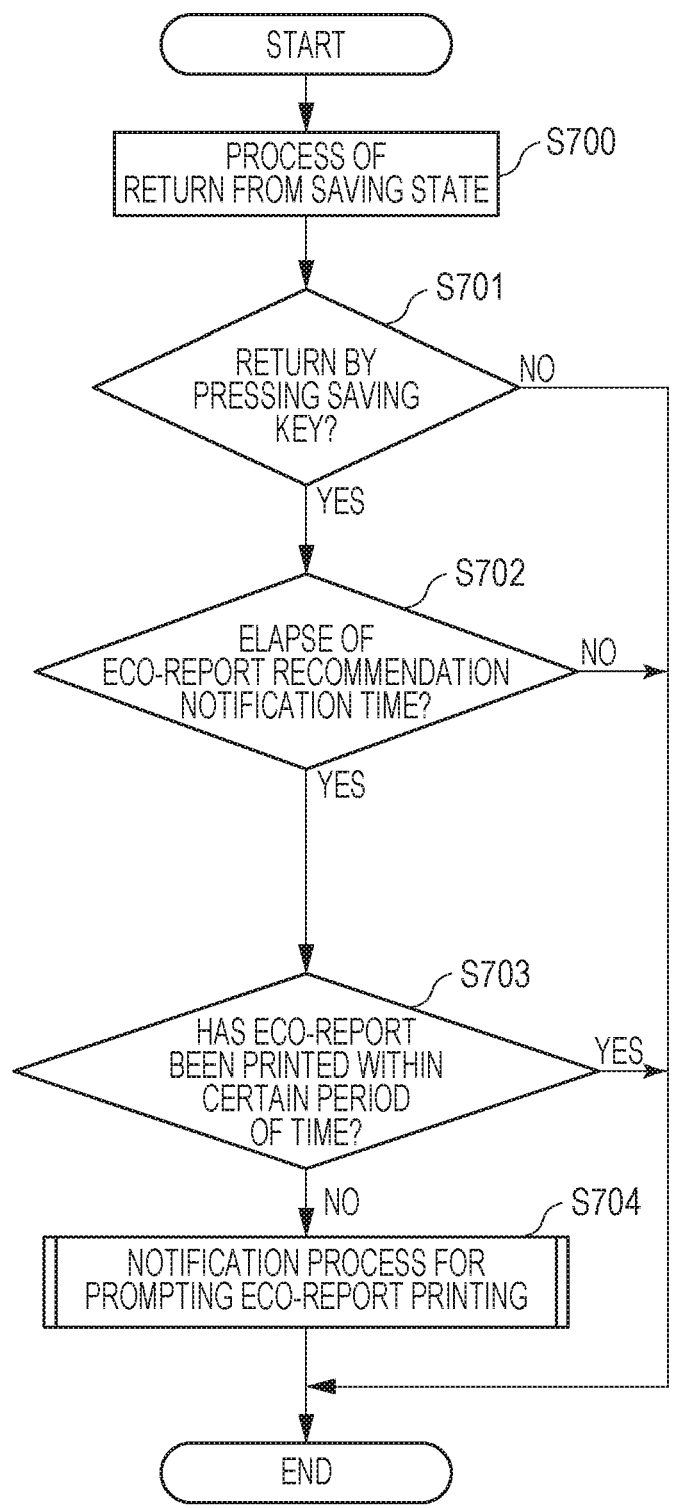
FIG. 7 is a flowchart of a process at a time of return from a power saving state.

FIG. 7 is a flowchart of a process of an eco-report notification performed when the MFP 100 returns from the power saving state.

When the MFP 100 returns from the sleep state for some reason (S700), the CPU 101 determines whether the reason of the return from the power saving state corresponds to a press of the power saving key 906 (S701). Note that a return flag stored in the RAM 103 at a time of the return of the MFP 100 is used to determine the return reason. Different values are stored in the return flag for different return reasons.

When the return reason of the MFP 100 is not a press of the power saving key 906 (S701: No), that is, when the return reason corresponds to an input of a print job from the PC, for example, the CPU 101 terminates the process. Specifically, the CPU 101 does not display the notification screen 1000 on the touch panel 901.

On the other hand, when the return reason of the MFP 100 corresponds to a press of the power saving key 906 (S701: Yes), the CPU 101 proceeds to step S702. Then the CPU 101 determines whether the current time has reached the eco-report recommendation notification time (S702). When the current time has not reached the eco-report recommendation notification time in step S702, the CPU 101 terminates the process. On the other hand, when the current time has reached the eco-report recommendation notification time in step S702, the CPU 101 proceeds to step S703. Thereafter, the CPU 101 determines whether the eco-report 300 has been printed within a predetermined period of time.

Specifically, the CPU 101 compares the current time with information on the eco-report last printing date and time 262. Then the CPU 101 determines whether the current time is different from the eco-report last printing date and time 262 by at least the certain number of days. Note that the certain number of days is stored in the ROM 102 as day threshold information (not illustrated).

When it is determined that the eco-report 300 has been printed within a predetermined period of time (S703: Yes), the CPU 101 terminates the process. This is because the eco-report 300 was printed recently and a notification is not required. When it is determined that the eco-report 300 has not been printed within the predetermined period of time (S703: No), the CPU 101 performs a notification process for prompting eco-report printing (S704).

According to the flow described above, the return reason may be checked when the MFP 100 is recovered. When the return reason corresponds to a press of the power saving key 906 and the eco-report printing has not been performed within the predetermined period of time, a notification for prompting the eco-report printing may be displayed. Since the notification is displayed when the MFP 100 returns from the power saving state, the user who moved close to the MFP 100 so as to operate the power saving key 906 may reliably recognize content of the notification displayed on the touch panel 901.

Figure 8:
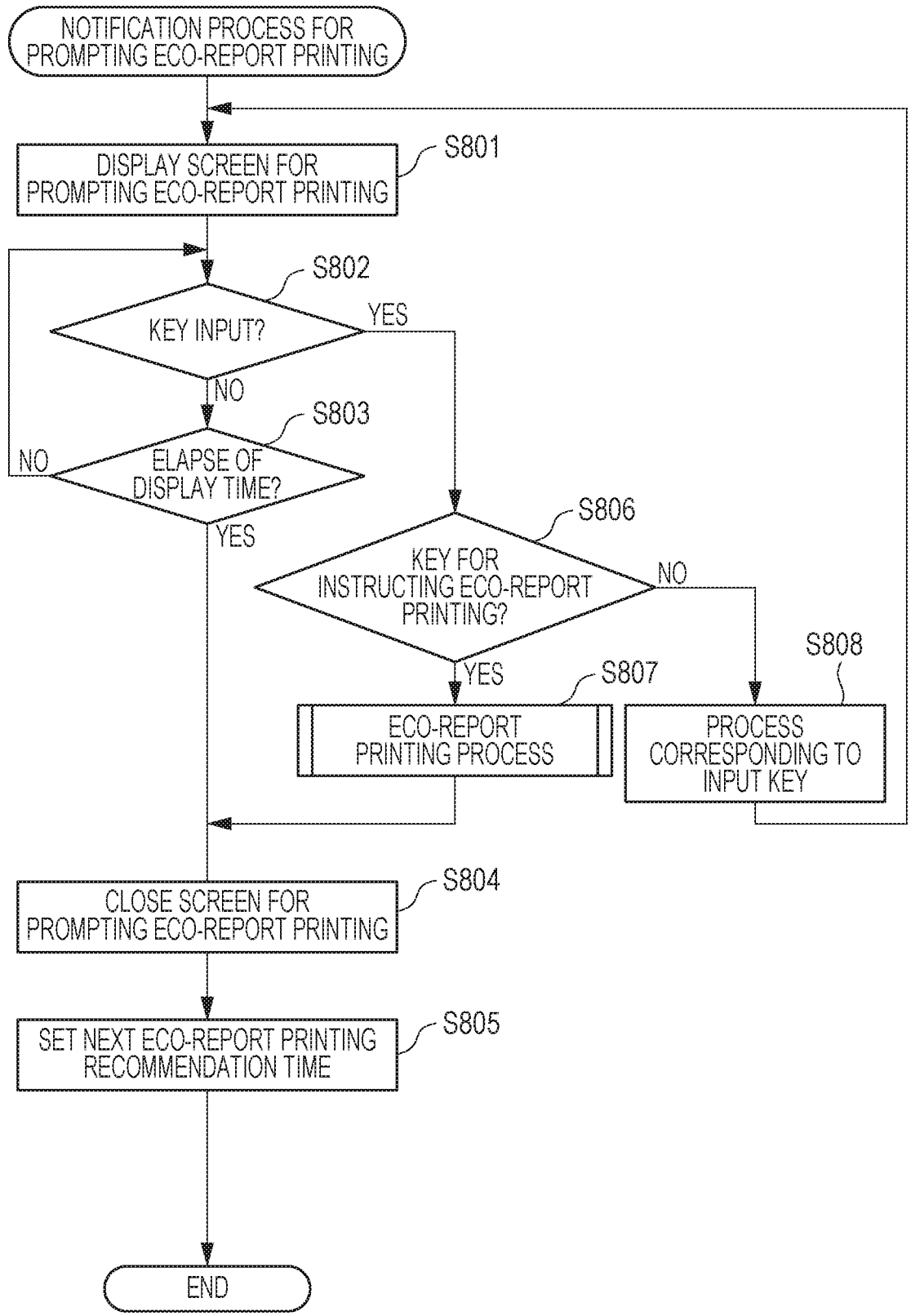
FIG. 8 is a flowchart of a notification process for prompting the eco-report printing.

Next, control performed after the notification for prompting the eco-report printing will be described. As the notification for prompting the eco-report printing, the notification is to be reliably transmitted to the user. Simultaneously, operability of the panel 104 is not to be deteriorated. Therefore, in this embodiment, the notification is displayed after it is determined that the user is positioned near the MFP 100, and the notification is deleted after a predetermined period of time has elapsed. FIG. 8 is a flowchart of control performed after the notification for prompting the eco-report printing is transmitted in this embodiment.

When a condition for displaying the notification is satisfied, the CPU 101 displays the notification screen 1000 for prompting the eco-report printing on the touch panel 901 (S801).

While the notification screen 1000 is displayed, the CPU 101 determines whether the panel 104 has been operated (whether a key input has been performed) (S802). When a key input is detected (S802: Yes), the CPU 101 proceeds to step S806. When a key input is not detected (S802: No), the CPU 101 proceeds to step S803. Thereafter, the CPU 101 measures (counts) a display time of the notification screen 1000 by the counter 118 until a key input is detected (S803: No). When a key input is not detected and the display time of the notification screen 1000 becomes longer than a predetermined period of time (S803: Yes), the CPU 101 deletes the notification screen 1000 for prompting the eco-report printing from the touch panel 901 (S804). The deletion of the notification screen 1000 corresponds to termination of the display of the notification screen 1000. Here, the touch panel 901 is continuously lit and the main screen, such as the selection screen 1010, the input screen 1020, the selection screen 1030, or the print instruction screen 1040, is continuously displayed. Specifically, the deletion of the notification screen 1000 is different from turning off of the touch panel 901.

Furthermore, the deletion of the notification screen 1000 is different from blinking of the notification screen 1000. When the notification screen 1000 blinks, display and non-display of the notification screen 1000 are alternately performed while the touch panel 901 is turned on. On the other hand, when the notification screen 1000 is deleted, the notification screen 1000 is not displayed until the condition is satisfied next. Therefore, when the notification screen 1000 is deleted, the notification screen 1000 is displayed only after the eco-report recommendation notification time elapses and the MFP 100 is turned on again (turning on after turning off) or the MFP 100 returns from the sleep state.

Subsequently, the CPU 101 calculates a next eco-report recommendation notification time and stores the next eco-report recommendation notification time in the eco-report recommendation notification time 261 in the RAM 103. Specifically, a timing when the eco-report recommendation notification is performed is determined in a program included in the ROM 102. In a case where it has been determined that the notification is performed after 9:00 am in the 20th day of each month, the CPU 101 determines 9:00 am in the next 20th day as an eco-report recommendation notification time in accordance with information on a current time. After updating the eco-report recommendation notification time 261, the CPU 101 terminates the process.

When a key input has been performed using the panel 104 in step S802, the CPU 101 determines whether the input key has instructed the eco-report printing in step S806. While the notification screen 1000 is displayed, a long press of the reset key 902 corresponds to the instruction for the eco-report printing. Therefore, when a long press of the reset key 902 is detected or the report execution button 1001 is selected (S806: Yes), the CPU 101 executes the eco-report printing process (S807). Then the CPU 101 deletes the notification screen 1000. Specifically, the notification screen 1000 is not displayed until the next eco-report recommendation notification time.

When a long press of the reset key 902 is not detected or the report execution button 1001 is not selected (S806: No), the CPU 101 executes a process corresponding to the input key (S808). For example, the user may select an icon displayed in the selection screen 1010, the input screen 1020, the selection screen 1030, or the print instruction screen 1040 while the notification screen 1000 is displayed. Specifically, the user may instruct execution of printing, scanning, and copying by operating the touch panel 901. Furthermore, the user may instruct execution of printing, scanning, and copying by pressing the selectable start key 903.

According to the flow described above, the MFP 100 may perform the notification for prompting the eco-report printing. Furthermore, the MFP 100 may terminate the display of the notification screen 1000 when a predetermined period of time has elapsed after the display of the notification screen 1000 is started. In addition, the user may perform operations using the panel 104 other than the instruction for printing the eco-report 300 while the notification screen 1000 is displayed.

Here, the description above is made on the assumption that the notification is uniformly performed for all users who operate the MFP 100. However, the notification control described with reference to FIGS. 6 to 8 may be employed only when a specific user logs in. For example, the notification screen 1000 may be displayed only when the display condition described above is satisfied and an administrator user logs in the MFP 100. Specifically, control may be performed such that, if a user other than the administrator user logs in, the notification screen 1000 is not displayed.

As described above, according to this embodiment, the notification for prompting the eco-report printing may be periodically performed. Therefore, the user does not forget to print the eco-report 300. The notification is performed when the user is positioned near the MFP 100. Accordingly, the user may reliably recognize content of the notification. This notification automatically disappears when a certain period of time has elapsed or after the eco-report 300 is printed. Therefore, deterioration of the operability of the panel 104 may be suppressed. The notification is displayed separately from the normal operation screen of the panel 104. Therefore, the user may perform other operations even while the notification screen 1000 is displayed. That is, the deterioration of the operability of the panel 104 may be suppressed.

Note that, although the eco-report printing is taken as an example of a purpose of the notification, the notification may be performed for other purposes as long as printing is performed. For example, the MFP 100 may perform a notification for prompting calibration of the printer 108. When calibration is performed in the MFP 100, first, a patch image is printed on a sheet, and thereafter, the patch image on the sheet is scanned by the scanner 107 so that calibration data is generated. Specifically, when a notification screen for prompting the calibration is displayed, the user may start printing of the patch image by performing a long press on the reset key 902 or by selecting an execution button. An image for printing is corrected using the generated calibration data so that the image forming apparatus may perform printing with desired quality.

However, the execution of the calibration considerably affects the quality of the output image when compared with the execution of the eco-report printing. Therefore, the notification for prompting the execution of the calibration is preferably performed by pop-up so that the user securely determines whether the calibration is to be executed. On the other hand, the execution of the eco-report printing less affects the quality of the output image when compares with the execution of the calibration. Accordingly, the notification for prompting the execution of the eco-report printing is performed in a method in which selection is not forcedly performed as described in this embodiment.

Other Embodiments

The present disclosure may be also realized by executing the following process. Specifically, software (programs) which realizes the functions of the foregoing embodiment is supplied to a system or an apparatus through a network or various storage media, and a computer (or a CPU or an MPU) included in the system or the apparatus reads and executes the programs. Note that a single storage medium or a plurality of storage media may be used as the various storage media. A single computer (or a single CPU or a single MPU) or a plurality of computers (a plurality of CPUs or a plurality of MPUs) may be employed in the apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:
   an image forming device for forming an image on a sheet;
   a display device for displaying information for a user; and
   one or more controllers configured to perform operations including:
   displaying, on the display device, a notification for prompting execution of printing a report, in a case where a predetermined timing condition is satisfied, wherein the report includes at least a value that indicates past usage of the image forming apparatus, and
   causing the image forming apparatus to print the report.

2. The image forming apparatus according to claim 1, further comprising at least a hard key,
   wherein the one or more controllers are configured to further perform operations including proceeding with procedures for giving a print instruction for printing the report upon pressing of the hard key in a state in which the notification is displayed on the display device.

3. The image forming apparatus according to claim 1,
   wherein a screen on which the notification is displayed is a screen that includes a selectable object, and
   wherein the one or more controllers are configured to further perform operations including proceeding with procedures for giving a print instruction for printing the report upon selection of the selectable object in a state in which the notification is displayed on the display device.

4. The image forming apparatus according to claim 3, wherein a predetermined name is assigned to the selectable object.

5. The image forming apparatus according to claim 1, wherein the one or more controllers are configured to further perform operations including determining whether the predetermined timing condition is satisfied.

6. The image forming apparatus according to claim 5,
   wherein the one or more controllers are configured to further perform operations including obtaining date information on a current date, and
   wherein the date information on the current date is used in determining whether the predetermined timing condition is satisfied.

7. The image forming apparatus according to claim 5,
   wherein the one or more controllers are configured to further perform operations including storing date information of a predetermined set date, and
   wherein the date information of the predetermined set date is used in determining whether the predetermined timing condition is satisfied.

8. The image forming apparatus according to claim 7, wherein the predetermined set date is a date set at an interval of once a month.

9. The image forming apparatus according to claim 5, wherein, when the image forming apparatus is started, a process of determining whether the predetermined timing condition is satisfied is performed.

10. The image forming apparatus according to claim 5, wherein, when the image forming apparatus returns from a sleep state, a process of determining whether the predetermined timing condition is satisfied is performed.

11. The image forming apparatus according to claim 10, wherein the image forming apparatus returns from the sleep state in a case where a predetermined key is pressed.

12. The image forming apparatus according to claim 5, wherein ,when the image forming apparatus detects a presence of a person in a vicinity of the image forming apparatus, a process of determining whether the predetermined timing condition is satisfied is performed.

13. The image forming apparatus according to claim 1,
   wherein the notification is arranged as a message in a first display region of a first screen that has the first display region and a second display region, and
   wherein the one or more controllers are configured to further perform operations including causing the display device to display a second screen which does not have the first display region but has the second display region.

14. The image forming apparatus according to claim 13, wherein the one or more controllers are configured to further perform operations including:
   obtaining date information on a current date,
   displaying the first screen in the display device when the date information on the current date indicates a date after a specific date, and
   displaying the second screen in the display device when the date information on the current date indicates a date before the specific date.

15. The image forming apparatus according to claim 13, wherein the one or more controllers are configured to further perform operations including:
   displaying the first screen in the display device when a login user is an administration user, and
   displaying the second screen in the display device when the login user is not an administration user.

16. The image forming apparatus according to claim 13, wherein the one or more controllers are configured to further perform operations including displaying the second screen in the display device when a predetermined period of time has elapsed after the first screen is displayed.

17. The image forming apparatus according to claim 1, wherein the value that indicates the past usage of the image forming apparatus per a predetermined time period is based on print history.

18. The image forming apparatus according to claim 17, wherein the past usage value indicates a number of sheets printed per month.

19. The image forming apparatus according to claim 17, wherein the past usage value is any one of a number of sheets printed using a copy function, a number of sheets printed using a print function, and a number of sheets printed using a facsimile function.

20. The image forming apparatus according to claim 17, wherein the past usage value indicates either one of a number of sheets printed on two sides and a number of sheets in which a plurality of documents are collectively printed in one sheet.

21. The image forming apparatus according to claim 1, further comprising a power source configured to supply electric power, wherein the one or more controllers are configured to further perform operations including obtaining electric power information associated with power consumption of the power source, and wherein the value that indicates the past usage of the image forming apparatus is based on the obtained electric power information.

22. The image forming apparatus according to claim 21, wherein the past usage value indicates power consumption per month.

23. The image forming apparatus according to claim 21, wherein the past usage value indicates an estimation value of power consumption in a case where a specific setting is used.

24. The image forming apparatus according to claim 1, wherein the one or more controllers are configured to further perform operations including obtaining print data from an external apparatus.

25. The image forming apparatus according to claim 1, further comprising a reading device configured to read a document, wherein the one or more controllers are configured to further perform operations including causing the reading device to read the document to obtain print data.

26. A method for controlling an image forming apparatus having an image forming device for forming an image on a sheet, and having a display device for displaying information for a user, the method comprising:

displaying, on the display device, a notification for prompting execution of printing a report, in a case where a predetermined timing condition is satisfied, wherein the report includes at least a value that indicates past usage of the image forming apparatus; and causing the image forming apparatus to print the report.

27. A non-transitory computer-readable storage medium storing a program to cause a computer to perform a method for controlling an image forming apparatus having an image forming device for forming an image on a sheet, and having a display device for displaying information for a user, the method comprising:

displaying, on the display device, a notification for prompting execution of printing a report, in a case where a predetermined timing condition is satisfied, wherein the report includes at least a value that indicates past usage of the image forming apparatus; and causing the image forming apparatus to print the report.

* * * * *